US012806567B2

(12) United States Patent
Abanades García et al.

(10) Patent No.: US 12,806,567 B2
(45) Date of Patent: Nov. 24, 2026

(54) METHOD TO INCREASE $CO_2$ CAPTURE EFFICIENCIES BY CARBONATION AND RELATED CARBONATOR

(71) Applicant: CONSEJO SUPERIOR DE INVESTIGACIONES CIENTÍFICAS (CSIC), Madrid (ES)

(72) Inventors: Juan Carlos Abanades García, Oviedo (ES); Borja Arias Rozada, Oviedo (ES)

(73) Assignee: CONSEJO SUPERIOR DE INVESTIGACIONES CIENTÍFICAS (CSIC), Madrid (ES)

(*) Notice: Subject to any disclaimer, the term of this patent is extended or adjusted under 35 U.S.C. 154(b) by 322 days.

(21) Appl. No.: 18/724,333

(22) PCT Filed: Dec. 29, 2022

(86) PCT No.: PCT/EP2022/088019
§ 371 (c)(1),
(2) Date: Jun. 26, 2024

(87) PCT Pub. No.: WO2023/126485
PCT Pub. Date: Jul. 6, 2023

(65) Prior Publication Data

US 2025/0065266 A1 Feb. 27, 2025

(30) Foreign Application Priority Data

Dec. 29, 2021 (EP) .................................... 21383230

(51) Int. Cl.
*B01D 53/22* (2006.01)
*B01D 53/62* (2006.01)
(Continued)

(52) U.S. Cl.
CPC ............ *B01D 53/83* (2013.01); *B01D 53/62* (2013.01); *B01D 53/96* (2013.01);
(Continued)

(58) Field of Classification Search
CPC ........ B01D 53/83; B01D 53/62; B01D 53/96; B01D 2251/404; B01D 2256/22; B01D 2258/0233
See application file for complete search history.

(56) References Cited

U.S. PATENT DOCUMENTS 5,665,319 A 9/1997 Hirama et al.
6,737,031 B2 5/2004 Beal et al.
(Continued)

FOREIGN PATENT DOCUMENTS

CN 105521702 B 11/2018
DE 102007015082 A1 10/2008
(Continued)

OTHER PUBLICATIONS

Yolanda A. Criado, "Effect of the Carbonation Temperature on the CO2 Carrying Capacity of CaO", Article, 2018, 12598-12599, vol. 57, Industrial & Engineering Chemistry Research.
(Continued)

*Primary Examiner* — Anthony Shumate
(74) *Attorney, Agent, or Firm* — Hayes Soloway PC

(57) ABSTRACT

This invention discloses a method to increase the $CO_2$ capture efficiency in a fluidized bed carbonator of CaO or $Ca(OH)_2$ by exploiting the characteristics of a solid entrainment zone at the exit of the carbonator, where fine solids are in contact with the gas exiting the carbonator. The method being characterized by selectively cooling said entrainment zone to 500-600° C. by feeding the to the beginning of a solid entrainment zone part of the make-up flow of limestone at ambient temperature, by installing a heat exchanger
(Continued)

section of a water/steam circuit, by spraying water or by feeding a flow of $Ca(OH)_2$ powder at ambient temperature to capture the $CO_2$ from the gas already depleted in $CO_2$ that leaves the denser region of solids that is present at the bottom of the carbonator.

13 Claims, 7 Drawing Sheets

(51) Int. Cl.
*B01D 53/83* (2006.01)
*B01D 53/96* (2006.01)

(52) U.S. Cl.
CPC .... *B01D 2251/404* (2013.01); *B01D 2256/22* (2013.01); *B01D 2258/0233* (2013.01)

(56) References Cited

U.S. PATENT DOCUMENTS 7,837,975 B2 11/2010 Iyer et al.
8,512,661 B2 * 8/2013 Fan .................... B01J 20/3491 422/162
8,877,150 B1 * 11/2014 Fan .................... B01D 53/60 423/239.1
9,651,252 B2 * 5/2017 Abanades Garcia .. B01D 53/96
2010/0086456 A1 * 4/2010 Epple .................... B01D 53/62 423/230
2011/0200520 A1 * 8/2011 Ramkumar ............ B01D 53/62 423/655
2011/0286902 A1 * 11/2011 Fan .................... B01J 20/043 422/619
2012/0175136 A1 * 7/2012 Trevino Villareal ... C04B 7/365 166/402
2014/0112857 A1 4/2014 Balfe et al.
2014/0186247 A1 * 7/2014 Abanades Garcia .. B01D 53/83 423/230
2014/0352581 A1 * 12/2014 Abanades Garcia .... F23J 15/02 110/203
2015/0343373 A1 * 12/2015 Balfe .................... B01D 53/73 422/177
2017/0096335 A1 * 4/2017 Wormser ............ B01D 53/047
2017/0333829 A1 * 11/2017 Tan .................... B01D 53/12
2020/0108346 A1 4/2020 Lu et al.
2024/0360033 A1 * 10/2024 Romano ................ B01D 53/62

FOREIGN PATENT DOCUMENTS

EP 2559475 A1 2/2013
EP 2808073 B1 7/2020

OTHER PUBLICATIONS

B. Arias, "Demonstration of steady state CO2 capture in a 1.7 MWth calcium looping pilot", Journal, 2013, 237-245, vol. 18, International Journal of Greenhouse Gas Control.
Martin Helbig, "Long-term carbonate looping testing in a 1 MWth pilot plant with hard coal and lignite", Article, 2017, 1-13, 13th International Conference on Greenhouse Gas Control Technologies, GHGT-13, Nov. 14-18, 2016, Lausanne, Switzerland.
Edoardo De Lena, "Integrated Calcium Looping System with Circulating Fluidized Bed Reactors for Low CO2 Emission Cement Plants", Article, 2021, 1-11, 15th International Conference on Greenhouse Gas Control Technologies, GHGT-15.
T. Shimizu, "A Twin Fluid-Bed Reactor for Removal of CO2 from Combustion Processes", Article, 1999, 62-68, vol. 77, Part A, Trans IChemE.

* cited by examiner

METHOD TO INCREASE $CO_2$ CAPTURE EFFICIENCIES BY CARBONATION AND RELATED CARBONATOR

CROSS-REFERENCE TO RELATED APPLICATIONS AND PRIORITY

This patent application claims priority from PCT Application No. PCT/EP2022/088019 filed Dec. 29, 2022 which claims priority from European Patent Application No. 21383230.6 filed Dec. 29, 2021.

OBJECT OF THE INVENTION

This invention discloses a method to increase the $CO_2$ capture efficiencies by carbonation in the fluidized bed carbonator reactor of a calcium looping process by exploiting the characteristics of a solid entrainment zone at the exit of the carbonator, where fine solids are in contact with the gas exiting the carbonator. The method is characterized by selectively cooling said entrainment zone to 500-600° C., by feeding part of the make-up flow of limestone at ambient temperature to the beginning of a solid entrainment zone, and/or alternatively by installing a heat exchanger section of a water/steam circuit, and/or alternatively by spraying water and/or alternatively by feeding a flow of $Ca(OH)_2$ powder at ambient temperature to capture the $CO_2$ from the gas already depleted in $CO_2$ that leaves the denser region of solids that is present at the bottom of the carbonator.

FIELD OF THE INVENTION

Capture of $CO_2$ from industrial gas streams or power plants, using fluidised or entrained beds of CaO and/or $Ca(OH)_2$.

BACKGROUND OF THE INVENTION

There are a number of processes to capture $CO_2$ from a gas using CaO or $Ca(OH)_2$ to form $CaCO_3$ in one reactor (the "carbonator" reactor) and then regenerate the $CaCO_3$ into CaO and $CO_2$ in high purity form (i.e. >95% v CO2 in dry basis), in a so called "calciner" reactor. In many cases the full $CO_2$ capture system ("calcium looping" system, CaL, or "carbonate looping" system) involves interconnected fluidised bed carbonator and calciner reactors. Reference is made to the pioneering work in this field described in U.S. Pat. No. 5,665,319A and in T. Shimizu et al (A twin fluid-bed reactor for removal of $CO_2$ from combustion processes, Trans IChemE, Vol 77, Part A, January 1999). Other examples of said calcium looping processes using fluidised beds are disclosed in U.S. Pat. No. 6,737,031B2, EP2559475A1, US2010/0086456A1, US2012/0175136A1, U.S. Pat. No. 7,837,975B2, U.S. Pat. No. 8,512,661B2 or EP13382206A1. They all share as a common feature a fluidised bed carbonator, that can be operated between 500-750° C. to capture $CO_2$ with CaO and/or $Ca(OH)_2$ and that has a relatively uniform temperature due to the inherent heat transfer characteristics of fluidised bed. There is general consensus in that the optimum temperature for carbonation is preferably around 650° C. This is because temperatures below 600° C. will tend to increase the heat requirements in the calciner (because more energy is needed to heat up the flow of solids coming from the carbonator up to calcination temperatures exceeding 850-900° C.). Temperatures lower than 600° C. will also reduce energy efficiencies in the steam cycle used to recover energy from the carbonator, and demand for higher heat transfer surface area in the boiler elements located in said carbonator. On the other hand, temperatures higher than 700° C. would facilitate higher steam conditions in the steam cycle recovering energy from the carbonator, leading to higher energy efficiencies of the process. Higher carbonation temperature also reduces the necessary heat transfer area to extract the thermal power released during carbonation. However, temperatures of 700° C. or higher in the carbonator will limit the maximum $CO_2$ capture efficiencies when operating at close to atmospheric pressure, because the equilibrium partial pressure of $CO_2$ on CaO is about 0.035 atm at 700° C. Typical $CO_2$ partial pressure in flue gases or fuel gases fed into the carbonator from industrial sources may range from just about 0.04 atm (for example from natural-gas fired combined cycles) to less than 0.15 atm (in many air-fired solid fuel combustion systems). Even operating a carbonator at the optimum temperature of 650° C. (where the equilibrium of $CO_2$ on CaO gives a partial pressure of $CO_2$ of 0.012 atm) would limit the $CO_2$ capture efficiency to between 70-90% in most combustion systems. This equilibrium-limited range of $CO_2$ capture efficiencies is increasingly seen as a weakness for calcium looping systems, because current policies to combat climate change demand for higher $CO_2$ capture efficiencies (i.e., exceeding 95% or even 99% when the origin of the $CO_2$ is fossil). The most advanced calcium looping systems using fluidised bed carbonators operating at close to atmospheric pressure, can only achieve high capture efficiencies operating at the low range temperature in the carbonator (the partial pressure of $CO_2$ is around 0.00096 atm at 550° C. and 0.0036 atm at 600° C.). This will however lead to the thermal inefficiencies noted above. In addition, these low temperatures of carbonation are known to be detrimental for the performance of the CaO sorbent, because lower carbonation temperatures are known to lead to lower carbonation conversions or $CO_2$ carrying capacities, due to the formation of a thinner layer of $CaCO_3$ on the reacting surfaces of CaO, marking the end of the fast carbonation period of CaO and the effective conversion of CaO to $CaCO_3$ in carbonator reactors (Y. Criado et al. 'Effect of the carbonation temperature on the $CO_2$ carrying capacity of CaO'. Ind. Eng. Chem. Res., 57, 12595-12599, 2018).

Calcium looping systems can make use of a variety of reactor types, but have only demonstrated their viability to operate at steady state in industrial environments and scales when using circulating fluidised bed technology, where they can exploit their similarity with commercial circulating fluidised bed boiler technology (B Arias et al. 'Demonstration of steady state CO2 capture in a 1.7 MWth calcium looping pilot". Int. J. of Greenhouse Gas Control, 18, 237-245, 2013; M. Helbig et al Long-term carbonate looping testing in a 1 MWth pilot plant with hard coal and lignite; Energy Procedia 114 (2017) 179-190). In circulating fluidised bed carbonators having dense fluidised zones, the gas containing $CO_2$ is the fluidising agent and the solids are well mixed and the temperatures are assumed to be homogeneous. After said dense or turbulent fluidized region, there is a solid disengagement zone followed by an entrainment zone in which solids with a terminal velocity lower than the superficial gas velocity can be in contact with the gas during several seconds (1 to 10), while transported out of the carbonator to a cyclone (or any other gas-solid separation device), where they separate into a $CO_2$ depleted gas and a solid stream containing $CaCO_3$, that are at the same temperature that the carbonator. The carbonated solids separated in the cyclone will be directed to the calciner (typically falling by gravity through standpipes or by other means). A known feature in the operation of the calciner that will be relevant for this invention, is that the calciner's cyclone efficiency is lower for finer particles and higher for the largest particle sizes. This is reported as a disadvantage in Arias et al (2013), because it is linked to the unwanted sorbent loses in the calcium loop by attrition of the limestone that is fed to the calciner as sorbent make-up flow, F0, needed to sustain the average $CO_2$ carrying capacity of maximum molar conversion of the CaO sorbent to $CaCO_3$, $X_{ave}$, between 0.1 and 0.2. However, the losses of fine particle materials from the calciner's cyclone is deliberately enhanced in Helbig et al 2017, as they deliberately feed finely pulverised lignite to the calciner and want to prevent the accumulation of lignite ashes in the calcium loop (that is known introduce several thermal and $CO_2$ capture inefficiencies). A recent publication by E. de Lena et al (Integrated Calcium Looping System with Circulating Fluidized Bed Reactors for Low $CO_2$ Emission Cement Plants; 15th International Conference on Greenhouse Gas Control Technologies, GHGT-15, March 2021, Abu Dhabi, UAE) also proposes the use of the calciner's cyclone to operate a calcium loop integrated in a cement plant as a kind of gross separator of fine particles generated during the known attrition of limestones in calciners from the coarser fractions that will be captured by the cyclone and circulate to the carbonator. Although the fluid-dynamics of dense gas-solid suspensions at high temperatures entering a cyclone or other type of gas-solid separator is a complex phenomena, it is understood that the feed of materials in a fine powdered form (such as the raw meals with dp50<20 micron used in cement plants, or the pulverized fuel fed to the calciner as in Helbig et al) will preferably leave the calcium loop as fly ash, while the larger size fractions in the solid feed that are typical in circulating fluidized calcium systems (between 50-250 micron) will be preferably captured in the calciner cyclone.

On the other hand, when high $CO_2$ capture efficiency and sorbent conversions are needed, it is known in the state of the art that $Ca(OH)_2$ has a much higher reactivity of effective $CO_2$ carrying capacity than CaO. U.S. Pat. No. 8,512,661B2 discloses calcium looping processes using $Ca(OH)_2$ instead of CaO in the carbonator. However, calcium looping methods using $Ca(OH)_2$ come with new process and energy efficiency challenges. These are related to the lower enthalpy of carbonation of $Ca(OH)_2$ (66 kJ/mol vs 170 kJ/mol for CaO), that drastically diminishes the energy output from the carbonator. To maintain energy recovery efficiencies in the overall calcium looping systems using $Ca(OH)_2$ instead of CaO there is a need to recover energy from the additional CaO hydration step to produce $Ca(OH)_2$. Such energy recovery cannot be as effective as the recovery of energy from the carbonation reaction, because hydration takes place at temperature between 400-500° C. even when hydrating in an atmosphere saturated in steam at close to atmospheric pressure, which are less suitable temperatures for efficient energy recovery than carbonation temperatures around 650° C. There are also other practical issues related to the comminution of solids during hydration, and other changes in particle properties during CaO hydration operations, that make the fluidisation and circulation of $Ca(OH)_2$ powder in the interconnected calcium looping system much more difficult than the fluidisation and circulation of the CaO parent particles.

The process of the present invention discloses a carbonation method that can be implemented in current calcium looping system and that can achieve $CO_2$ capture efficiencies exceeding 95% or even 99% in the carbonator while incurring in minimum changes in thermal efficiencies and minimum changes in the operation of the most proven and scalable elements of the interconnected calcium looping system using fluidised bed technology.

DESCRIPTION OF THE INVENTION

The objective of the method of this invention is to increase the $CO_2$ capture efficiency in a fluidized, entrained or circulating fluidized bed carbonator of CaO or $Ca(OH)_2$, comprising at least one solid entrainment zone in which solids are in contact with the gas while in suspension during 1-10 seconds until they separate (by example by using a cyclone) into a solid stream containing $CaCO_3$ and a $CO_2$ depleted gas. In circulating and bubbling fluidised beds this entrainment zone is in contrast with the "dense zone" or "turbulent zone" or "bubbling zone" located at the bottom of the carbonator, where intense mixing of solids imposes extremely high heat transfer coefficients, a temperature homogeneity in the bed, and where most of the carbonation of the solids and capture of $CO_2$ from the gas (i.e. capture efficiency >70%) take place. In entrained carbonator reactors, where the fluid-dynamic entrainment zone extends to most of the carbonator, the method of this invention applies to an entrainment zone section located closest to the exit of the carbonator. Note that the carbonator can have additional entrainment zones created when solids are re-entered and mixed with the gas separated from cyclones, as it is the case in calcium looping systems in the state of the art that make use of solid suspension preheaters set-ups.

The invention relates to a method to increase the $CO_2$ capture efficiencies by carbonation in the fluidized bed carbonator reactor of a calcium looping process comprising at least one solid entrainment zone in which solids are in contact with the gas while in suspension during 1-10 seconds until they separate into a solid stream containing $CaCO_3$ and a $CO_2$ depleted gas, the method characterized by generating at least two temperature zones in a carbonator by cooling to 500-600° C. at least one solid entrainment zone by at least one of the following steps:

i) by feeding a make-up flow of limestone at ambient temperature to the beginning of the at least one solid entrainment zone;
ii) by installing at the beginning of the at least one solid entrainment zone a heat exchanger section of a water/steam circuit that recovers energy from the calcium looping system;
iii) by spraying water to the beginning of the at least one solid entrainment zone;
iv) by feeding a flow of $Ca(OH)_2$ powder at ambient temperature to the beginning of the at least one solid entrainment zone at a molar rate of between 0.01-0.4 times of the molar rate of $CO_2$ entering the carbonator.

Experiments and simulations conducted to demonstrate the object of this invention and described in detail below show that there is an increase in $CO_2$ capture efficiency as steps i) to iv) are progressively implemented. This is because of the beneficial effect of selectively cooling the solid entrainment zone at the exit of the carbonator to reach more favourable equilibrium conditions for carbonation. By selective cooling of the solid entrainment zone towards the exit of the carbonator, higher temperature conditions in the bottom of the carbonator (650° C.-700° C.) can be maintained, which minimises the negative impacts known in the state of the art when operating the full carbonator at low temperatures.

Due to the limited reactivity of the partially carbonated solids flowing in the entrainment zone, the improvements in $CO_2$ capture efficiency have been estimated to be between 2-10 net percentual points when steps i) to iii) are taken within a carbonator. To increase $CO_2$ capture efficiencies further, the feeding of $Ca(OH)_2$ in iv) has the largest impact on $CO_2$ capture efficiency, due to the high reactivity of $Ca(OH)_2$ towards carbonation at the temperature window of 500-600° C. To minimise energy penalties and cost related to the use of $Ca(OH)_2$ instead of CaO, note that in the proposed method the $Ca(OH)_2$ is used only as a complementary sorbent to "polish" the gas resulting from the capture of $CO_2$ with CaO.

In a preferred embodiment, to achieve process intensification by conducting the desired reactions within an existing carbonator device, the method referred above is applied to an entrainment zone located inside the carbonator, just before the separation in a cyclone, of the $CO_2$ depleted gas and the carbonated solids.

Another preferred embodiment minimises the cooling requirements to bring the temperature of the entrainment zone to 500°-600° C. by avoiding the cooling in said entrainment zone of the main solid circulation flow moving upwards in said entrainment zone. In said embodiment, the main solid circulation flow is first separated in a first cyclone receiving gas and solids from the carbonator.

The method of this invention applies to an additional entrainment zone created by the feeding of part of the limestone make up flow and part of the $Ca(OH)_2$ powder to the $CO_2$ depleted gas after the separation of the $CO_2$ depleted gas and the carbonated solids from the carbonator (1).

Experimental results disclosed below indicate that well dispersed $Ca(OH)_2$ powder into such $CO_2$ depleted gas can be effectively used as a $CO_2$ polishing sorbent, by capturing the residual $CO_2$ leaving the carbonator and bringing the $CO_2$ content in the gas close to the equilibrium conditions at 500-600° C. This translates into maximum capture efficiencies, exceeding 99% over the $CO_2$ molar flow rate input to the carbonator. As experiments will show, this is achieved when the molar feed rate of $Ca(OH)_2$ to the additional entrainment zone is between 1 to 3 times the molar flow rate of $CO_2$ in the $CO_2$ depleted gas exiting the first entrainment zone. Since the original $CO_2$ depleted gas is loaded again with solids (part of the flow of limestone make up flow used to cool the gas and the flow of $Ca(OH)_2$ referred above), the method is further characterised by the separation from the $CO_2$ depleted gas of the carbonated solids exiting the additional entrainment zone and their feeding to the solid stream containing $CaCO_3$.

In other preferred embodiments of the method, depending on the targeted $CO_2$ capture efficiency and many factors affecting the $CO_2$ capture performance in the carbonator (in particular the $CO_2$ carrying capacity and carbonation degree of the solids leaving the carbonator), there will be a need to use the method simultaneously in more than one solid entrainment zone. A multiplicity of options to combine the cooling capacity of the different cooling steps i) to iv) in the different entrainment zones can be carried out.

There is a particular case of application of the method of this invention to carbonators integrated in a cement plant, or to other industries calcining flow rates of limestone at a molar rate of 1-5 times the molar flow rate of $CO_2$ in the flue gas. In such systems, part or all of the large flow of limestone at ambient temperature entering the system (usually mixed with other inert solids making up the raw meal to manufacture cleanker) will enter directly the solid entrainment zone of the carbonator, following the method of this invention, to achieve the target cooling of said entrainment zone. As will be illustrated in Example 3 below, such large solid input at ambient temperature to the carbonator entrainment zone is capable of reducing the temperature in said entrainment zone alone (i.e. with no other cooling method needed) and will generate a parent large flow of carbonated solids to the calciner. Since there is a need to purge out of the calcium loop most of these solids, the method is further characterised by the removal after calcination of between 50-90% of the solids exiting the carbonator. Such removal can be carried out with a certain mechanical split in the solid stream coming down from calciner cyclone and/or by allowing the cyclone of the calciner to be highly inefficient respect to the finer particles, as described in the state of the art for fine ashes or attritted fine particles of CaO.

The method of this invention can be carried out by retrofitting existing carbonator devices or by building dedicated carbonator devices to carry out the method. One of such preferred embodiments is a circulating fluidized bed carbonator device to carry out the method characterized by the following elements being located in an entrainment zone of 10-30 m length starting at 5-10 m over the bottom gas inlet to the carbonator:

i) a first solid feeding pipe at the beginning of the at least one entrainment zone to feed the make up flow of limestone entering the calcium loop and disperse the solids into the carbonator cross-section
ii) a heat exchanger section of the water evaporator of the steam cycle of the calcium loop, with the heat transfer surface distributed in the at least one entrainment zone, preferably extracting between 0.2-1.5 MWth per $m^2$ of the carbonator cross-section
iii) a second solid feeding pipe at the beginning of the at least one entrainment zone to feed $Ca(OH)_2$ in powdered form and disperse into the gas
iv) a water feeding pipe comprising nozzles to spray water into the gas at the beginning of the at least one entrainment zone until the target temperature between 500-600° C. is reached.

The preferred embodiments dedicated to $CO_2$ polishing, requiring an additional entrainment zone after the first separation of $CO_2$ depleted gas and carbonated solids containing $CaCO_3$ are preferably carried out in an entrained bed carbonator device characterized by:

i) a gas conduct to provide a residence time of 1 to 3 seconds to the $CO_2$ depleted gas leaving the first cyclone of the carbonator in a calcium looping system;
ii) a solid feeding pipe to feed part of the make up flow of limestone entering the calcium looping system to the beginning of the gas conduct and to disperse the solids into the gas;
iii) a water feeding pipe and associated nozzles to spray water to the beginning of the gas conduct;
iv) a solid feeding pipe connected to the beginning of the gas conduct to feed $Ca(OH)_2$ in powdered form and disperse it into the gas;
v) a second cyclone to separate the $CO_2$ depleted gas from solids fed to the gas conduct;
vi) a standpipe to feed the separated solids in the second cyclone to the solid stream containing $CaCO_3$ leaving the carbonator.

BRIEF DESCRIPTION OF THE DRAWINGS

The figures below reflect aspects for the practical execution of the invention and are used in the detailed description and examples. They are illustrative and have a non-limiting character, the following has been represented.

DETAILED DESCRIPTION OF THE INVENTION

Figure 1:
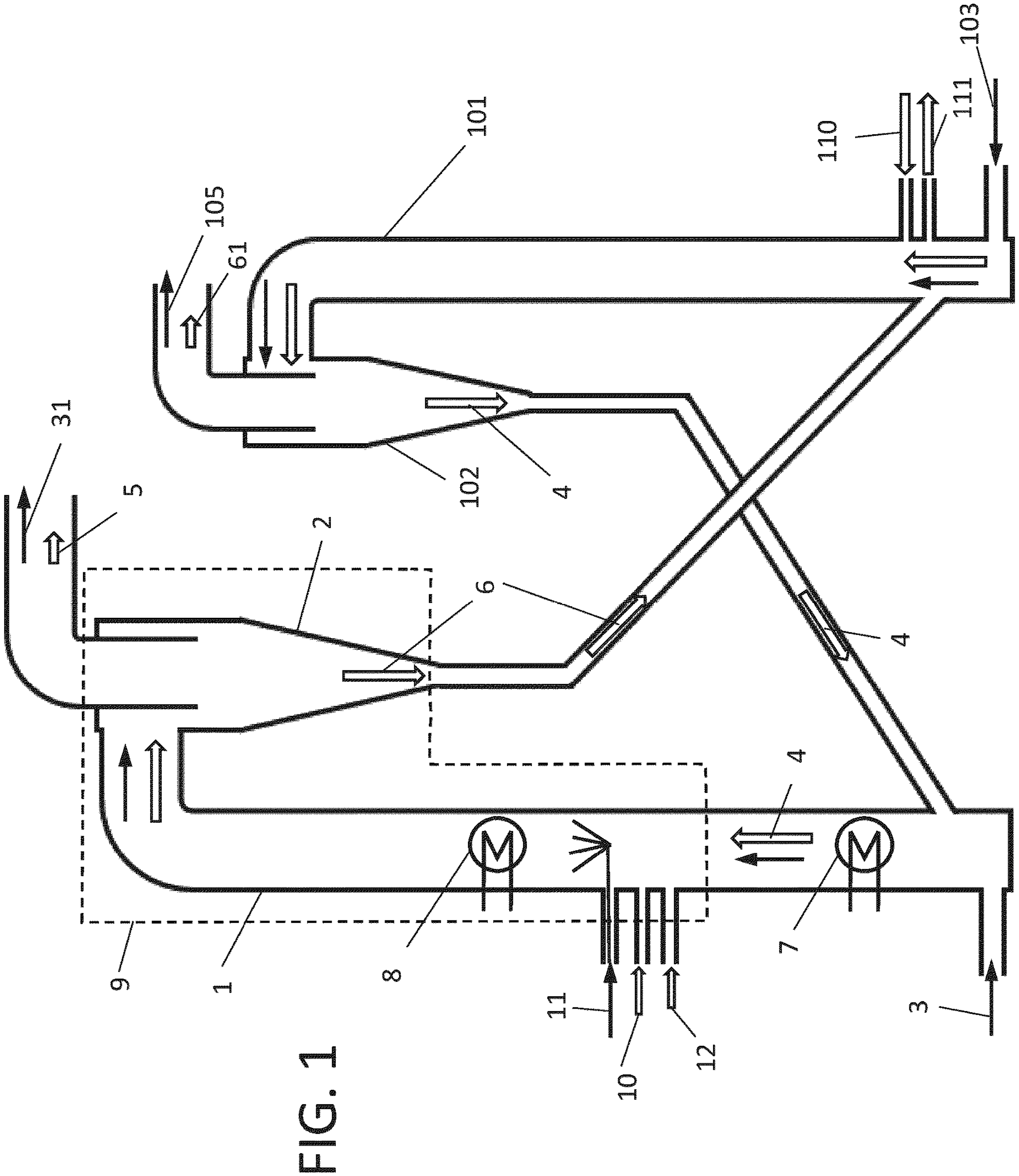
FIG. 1. Schematic representation of the solid entrainment zone in a circulating fluidized bed carbonator and the elements of this invention to enhance $CO_2$ capture in the carbonator.

Reference is made from this point to the accompanying drawings to define preferred embodiments of the invention. FIG. 1 represents a generic calcium looping system with a carbonator (1), where a flow of gas (3) containing $CO_2$ enters the bottom part of the carbonator and contacts with a flow of calcined material rich in CaO (4) to react and form $CaCO_3$. The carbonator cyclone (2) separates a $CO_2$ depleted gas (31) and a solid stream containing $CaCO_3$ (6) with certain solid losses as (5). A calciner (101) receives the solid stream containing $CaCO_3$ (6) and burns a fuel (110) typically with a $O_2/CO_2$ gas mixture (103) to calcine the $CaCO_3$ and produce a rich $CO_2$ stream (105). The cyclone (102) separates the rich $CO_2$ stream (105) from the calcined solid stream rich in CaO (4) which is returned to the carbonator (1) and certain sorbent losses or purges leave the calciner in the form of fly ash (61) and bottom ash (111). Relevant for the description of this invention is a solid entrainment zone (9) in the carbonator where most of the solids are in suspension in the gas and being transported by the gas in the same direction as the gas. In this region, the solids (4) are in contact with gas and will still react to form $CaCO_3$ in the solid entrainment zone. Let's consider for simplicity that the entrainment zone (9) giving gas-solid contact time also includes the pipe connecting the carbonator with the cyclone and the cyclone itself (2).

Figure 2:
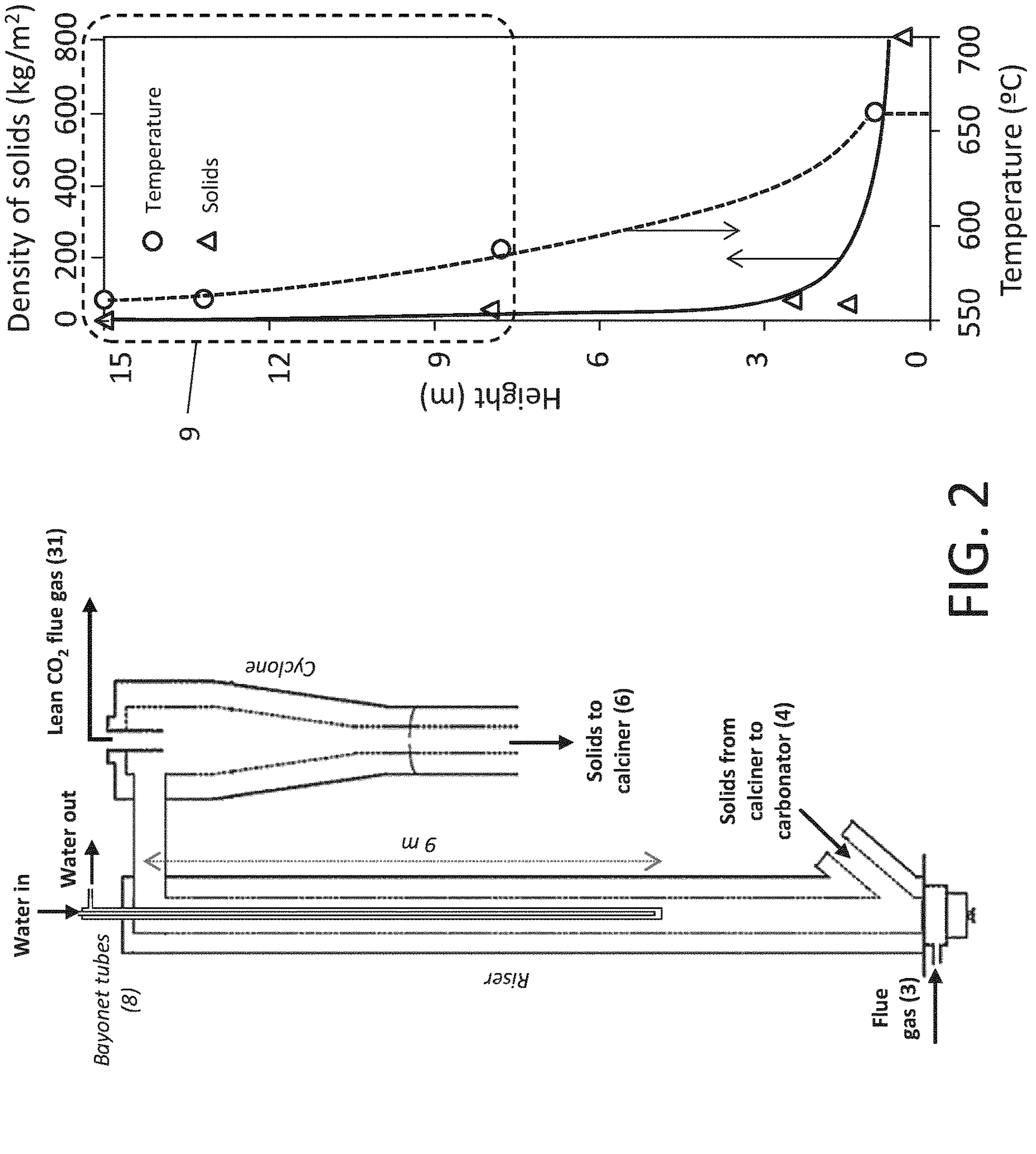
FIG. 2. Experimental results from a 1.7 MWth carbonator (shown on the left) indicating the region covered by the solid entrainment zone in the axial density profile in the carbonator (shown on the right).

FIG. 2 (left and right graphs) provides experimental evidence of the solid entrainment zone existing in a circulating fluidised bed carbonator used in the state of the art (Arias et al. 2013). The right graph shows the solid density profile (empty triangles) in the 15 m long carbonator chamber, displaying a typical dense fluidised bed region at the bottom (3 metres) of the carbonator, particularly dense in the first metre, and a large entrainment zone (9) covering more than half of the top of the carbonator chamber. Note that the dotted line marking said entrainment zone (9) in this invention has not been extended to the bottom of the chamber, to avoid embracing a large transition zone or solid disengagement zone known to be highly fluctuant in solid movements and still experiencing a strong back-mixing of solids with the dense region. It is important for the purpose of this invention to refer only to the solid entrainment zone (9), where the flow of gas and solids approaches an ideal plug-flow behaviour, with negligible retro-mixing of solids with the dense region at the bottom of the carbonator chamber. The installation of boiler elements or any other heat exchanger surface (7) to recover energy from the dense bottom region of the carbonator, typically leads to a homogeneous drop in temperature in the whole region, as this is one of the known advantages of dense fluidised beds. In contrast, the installation of heat transfer surfaces (8) in the solid entrainment region typically leads to axial temperature profiles (see experimental axial temperatures in FIG. 2).

On the other hand, the minimum $CO_2$ concentration allowed by the equilibrium is determined by the axial temperature profile measured in FIG. 2 (right). In the dense bed, the average temperature of 660° C., and this limits the minimum $CO_2$ partial pressure of $CO_2$ to a value of 0.015 atm, which can result into a maximum $CO_2$ capture efficiency of 0.88 ($CO_2$ partial pressure at the inlet of the carbonator was 0.135 atm during this test). The temperature profile created in the entrainment zone by the cooling of the water-cooled bayonet tubes heat exchanger (8) creates a "polishing effect", understood here as a capability to capture $CO_2$ from a gas that already contains a low concentration of $CO_2$ (i.e. less than 0.02 atm). Carbonation must take place in such solid entrainment zone. Indeed, this is a good explanation on the detected increase in $CO_2$ capture efficiency from a maximum of 88% (allowed by the equilibrium when assuming a uniform temperature profile of 660° C. along the carbonator) to the 96.1% measured in this particular experiment. Note that the maximum capture efficiency allowed by the equilibrium at the temperature at the exit of the carbonator would exceed 99%, indicating that the equilibrium is not reached at the end of the carbonator, due to certain kinetic limitations discussed below.

Figure 3:
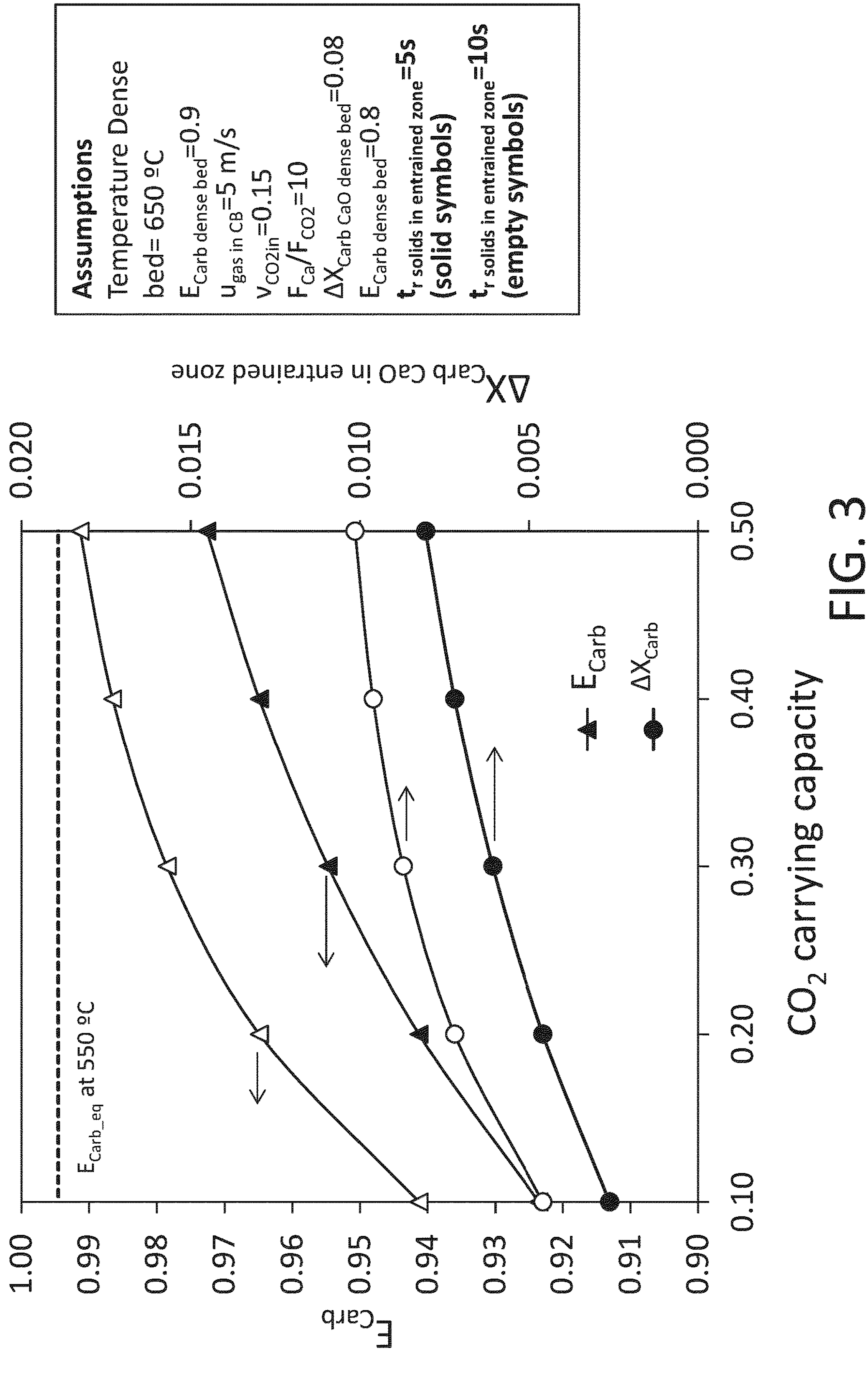
FIG. 3. Estimated improvement of $CO_2$ capture efficiency (left axis) and increase in solid conversion of the solids by cooling the solid entrainment zone from 650° C. to 550° C., all as a function of the initial $CO_2$ carrying capacity of the CaO entering the carbonator, wherein the black symbols correspond to a gas-solid contact time of 5 seconds while the empty symbols correspond to 10 s of gas-solid contact time.

FIG. 3 generalises the previous observations to other conditions that may be present in the carbonator entrainment zone. As will be shown in the examples, known kinetic parameters for the reaction of $CO_2$ on CaO allow the construction of this figure, that plots the gains in $CO_2$ capture efficiency (left axis) or incremental Ca molar conversion to carbonate (right axis) for two representative residence or contact times between CaO particles and the flue gas (5 s for solid symbols and 10 seconds for void symbols), all as a function of the activity or maximum $CO_2$ carrying capacity of the material entering the solid entrainment zone. This illustrative figure has been built assuming a temperature in the dense zone of 650° C. and a temperature in the solid entrainment zone of 550° C., with a $CO_2$ partial pressure at the inlet of the solid entrainment zone of 0.015 atm. As can be seen, there is a clear benefit in the $CO_2$ capture efficiency in all cases. However, due to kinetic limitations, the maximum $CO_2$ capture efficiency allowed by the equilibrium (dotted horizontal line at the top of the figure) is only approached when using extremely active materials and the longest (10 s) gas-solid contact times in the entrainment zone. Clearly, the addition in this entrainment zone of sorbents known in the state of the art for their high reactivity and $CO_2$ carrying capacity, such as $Ca(OH)_2$, will facilitate the highest $CO_2$ capture efficiencies allowed by the equilibrium.

Figure 4:
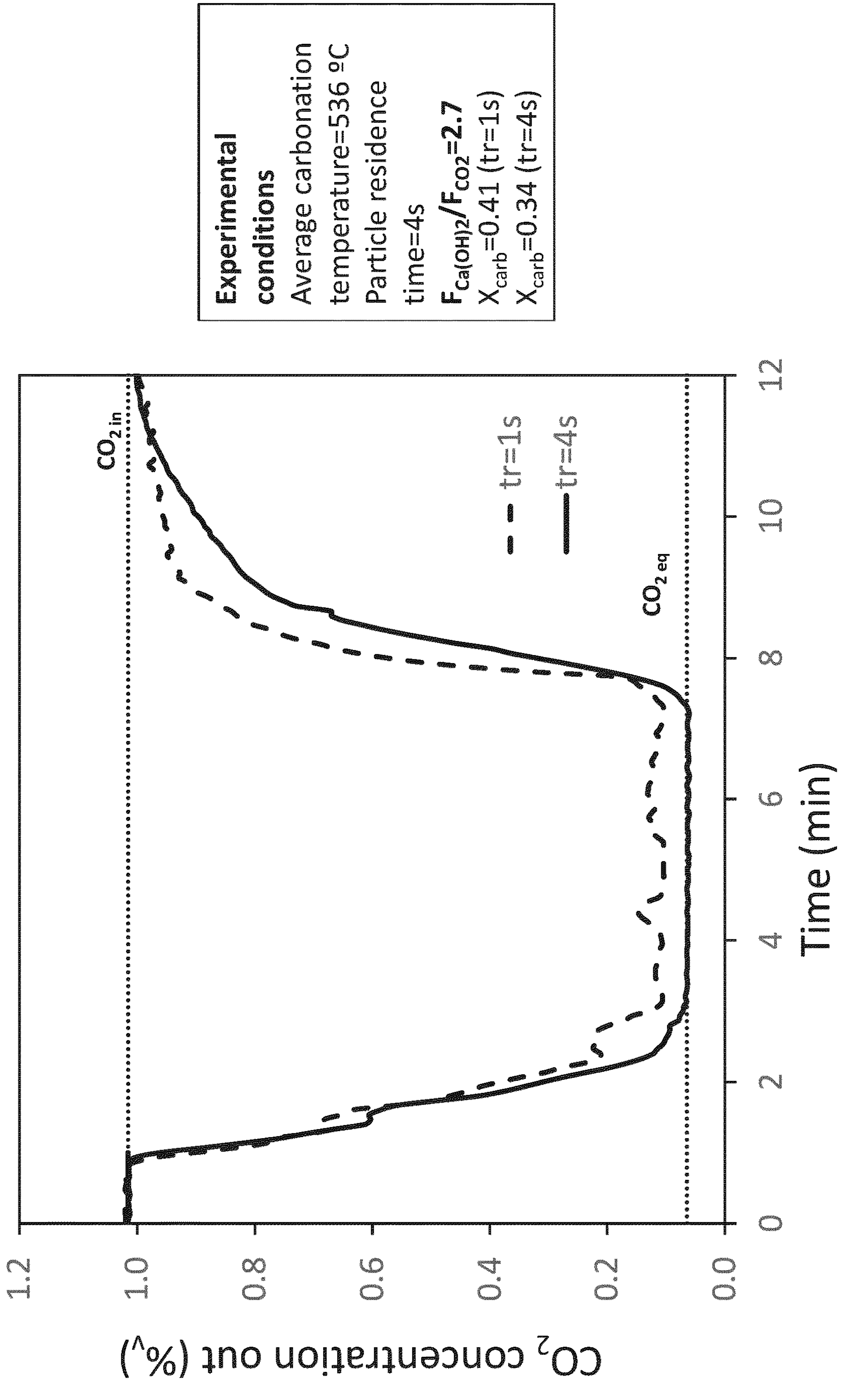
FIG. 4. Example of experimental evolution of the $CO_2$ concentration with time as measured in a drop tube apparatus at two locations with different gas-solid contact times (1 s and 4 s) when injecting a $Ca(OH)_2$ with a Ca/C molar ratio of 2.7 during a period of 7 minutes. Average temperature of 536° C., inlet $CO_2$ concentration of 0.01 atm.

The previous observations and related simulations lead to preferred embodiments of this invention where the cooling to 500-600° C. the solid entrainment zone (9) is achieved by one or more of the following steps with cooling capability in such region and with minimum negative impacts on the overall performance of the calcium loop:

i) by feeding the make-up flow of limestone at ambient temperature to the beginning of a solid entrainment zone. The necessary make-up flow input of fresh limestone to a calcium loop is usually defined as the ratio between the molar flow of $CaCO_3$ ($F_0$) and the molar flow in the flue gas ($F_{CO2}$). The ratio $F_0/F_{CO2}$ is known to vary by orders of magnitude depending on process-specific conditions and limestone attrition properties: from 4-5 in cement applications to values as low as 0.02 in calcium looping applications treating clean gases (i.e. virtually free of sulfur), using clean fuels (i.e. low S and ash content) in the calciner and non-attritable limestones. The use of all or a fraction of $F_0$ for cooling purposes of the solid entrainment zone is represented with the solid stream (10) in FIG. 1. The injection and dispersion of such flow of limestone to the carbonator entrainment zone will translate into a very fast cooling of the entrainment zone, as long as the particle size distribution of the solid flow rich in limestone (10) is adequate to be entrained into the carbonator gas flow (and avoid falling and mixing with the bottom dense region) following the teachings of the design of entrainment bed devices.

ii) by installing at the beginning of the entrainment zone a heat exchanger section (8) of the water/steam circuit that recovers energy from the calcium looping system. As will be illustrated in some examples, the cooling requirements can change between 0.2-1.5 MWth per $m^2$ of cross-section of the carbonator, mainly due to the large variability of solid densities and local flow rates possible at the entrance of the solid entrainment zone.

iii) by spraying water (11) to the beginning of a solid entrainment zone. Fast quenching by water evaporation may be needed in cases where i) and ii) are not sufficient to reach the targeted drop in temperature in the solid entrainment zone. However, since the energy of water evaporation cannot be recovered, this cooling option needs to be limited to particular cases where the solid circulation in the entrainment zone is particularly low, as will be described in specific examples below.

iv) by feeding a flow of $Ca(OH)_2$ powder (12) at ambient temperature to the beginning of a solid entrainment zone at a molar rate of between 0.01-0.4 times of the molar rate of $CO_2$ entering the carbonator. The cooling effect of this sorbent injection is combined with the known benefits described in the state of the art of the high reactivity of $Ca(OH)_2$ to capture $CO_2$ in very short contact times. This is tested for the $CO_2$ polishing applications used in this invention to enhanced $CO_2$ capture efficiencies. In a typical experiment of FIG. 4, conducted in a drop tube apparatus at an average temperature of 536° C., a flow of gas containing just 0.01 atm of $CO_2$ is introduced. Note that this inlet $CO_2$ concentration is a typical outlet concentration from the dense region of carbonator of a state of the art calcium looping system (see for example FIG. 2—right). As shown in FIG. 4, the injection of of $Ca(OH)_2$ powder to the gas, during 6 minutes from 1 to 7, has a dramatic impact in the $CO_2$ concentration measured in two locations of the drop tube (1.5 and 5.2 m from solid injection point respectively) corresponding to different gas-solid contact times (1 s and 4 s, respectively). The Ca/C molar ratio between the molar flow input of $Ca(OH)_2$ and the molar flow input in the gas is 2.7.

Figure 5:
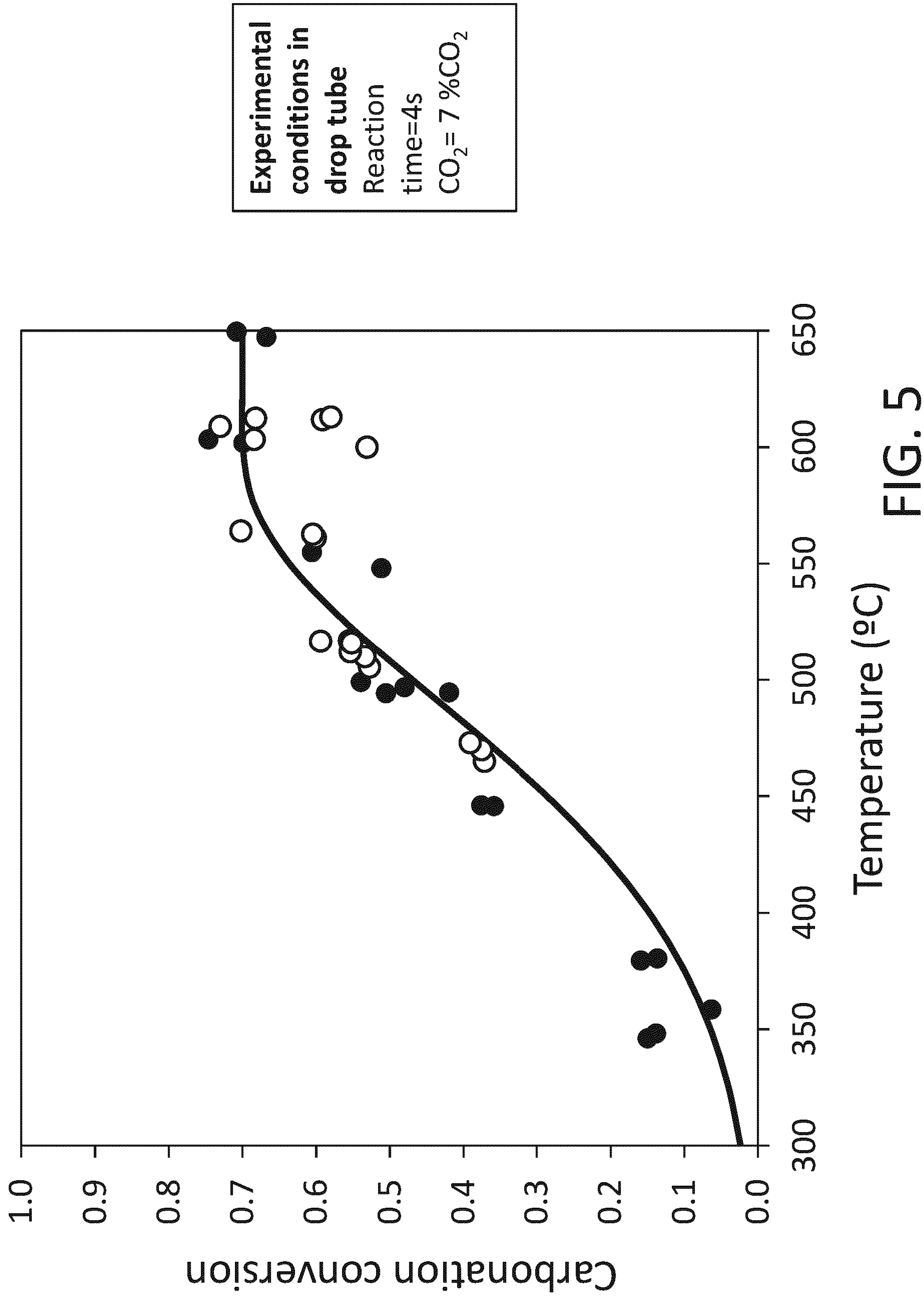
FIG. 5. Experimental determination of $Ca(OH)_2$ molar conversion to $CaCO_3$ as a function of temperature in a drop tube apparatus. Ca/C ratio: 2.7. $CO_2$ vol fraction 0.07 in dry air (black symbols) or in humid air (white symbols) with 0.15 vol fraction of $H_2O_{(v)}$.

In further support of the use of $Ca(OH)_2$ as polishing sorbent in the entrainment zone, FIG. 5 shows the effect of the temperature in the entrainment zone on the carbonation conversion of $Ca(OH)_2$ to $CaCO_3$ after a reaction time of 4 s. The results have been obtained in a drop tube apparatus with a reactor length of 5.2 m. $Ca(OH)_2$ with a purity of 95% and an average diameter of 5 μm has been used during these experiments. Temperature has an important effect on $Ca(OH)_2$ and carbonation conversion above 0.6 can be achieved at temperatures above 550° C., allowing for $F_{Ca(OH)2}/F_{CO2}$ ratios between 1.5-2.0.

The steps described above for cooling the solid entrainment zone and enhance the $CO_2$ capture efficiency do not increase the footprint of the $CO_2$ capture plant, because they just make a different or additional use of a region that already exists in circulating fluidised bed carbonators to disengage solids from gases and/or provide adequate gas-solid residence or contact times. However, depending on the $CO_2$ content of the gases (3) and the $CO_2$ carrying capacity of the solids (4) entering the carbonator, the minimum flow of solids circulating in the system (i.e. those entering as (4) to the carbonator) can be between 2-20 kg/$m^2$ s. Such solid circulation rate (in particular the large value of the range) has a very large impact on the cooling requirements in the solid entrainment zone, as will be shown in examples below.

Therefore, to avoid the mixing of this solid circulation flow and facilitate the cooling of the gas targeted for $CO_2$ polishing, another preferred embodiment of this invention involves the creation a new or additional solid entrainment zone (109) by mixing the $CO_2$ depleted gas and the small flow of solids (33, 34) leaving the first cyclone (2) of the carbonator with the make up flow of limestone (10), the flow of $Ca(OH)_2$ (12) and the water spray (11) that are needed for cooling the entrainment zone and enhance the capture of $CO_2$ in said entrainment zone. The $CO_2$ depleted gas (31) and the carbonated solids (22) result mainly from the reaction of $Ca(OH)_2$ with $CO_2$ (because the small flow of solids (34) is assumed to be negligible) and are separated in a second cyclone (21), with the carbonated solids (22) returned to the main flow of solids containing $CaCO_3$ (6) abandoning the carbonator and fed to the calciner (not shown in FIG. 6 for simplicity). In view of the experimental results obtained (see for example FIG. 4) when testing the carbonation of $Ca(OH)_2$ as a $CO_2$ polishing method to reduce the concentration of $CO_2$ in gases where the $CO_2$ concentration is low (i.e. below 0.02 atm) the molar feed rate of $Ca(OH)_2$ to the additional entrainment zone is between 1 to 3 times the molar flow rate of $CO_2$ in the $CO_2$ depleted gas exiting the first entrainment zone.

Figure 7:
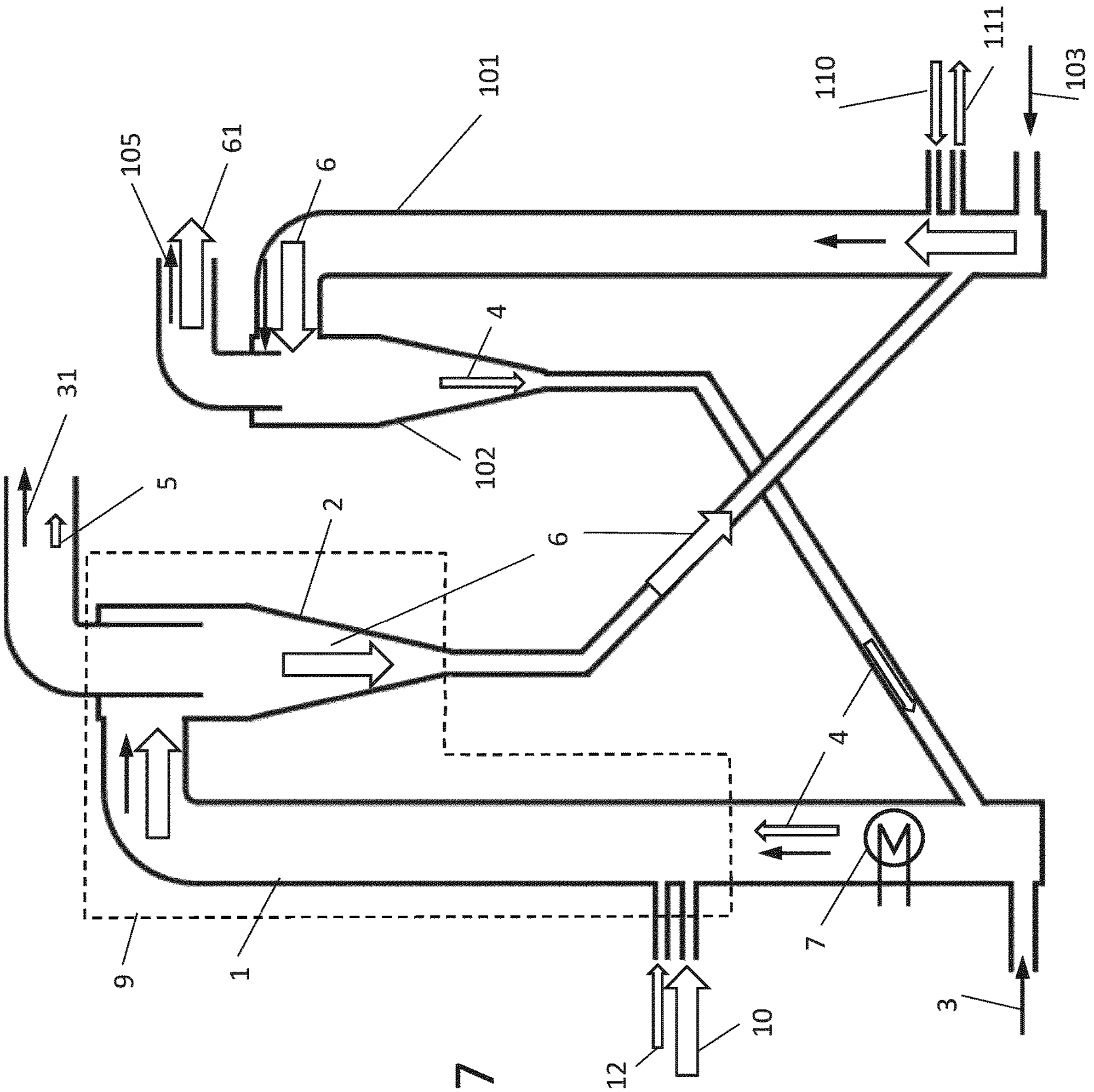
FIG. 7. Schematic representation of the method of the invention (as in FIG. 1) adapted to cement applications, by purging calcined solids as bottom ash and as fly ash to reduce and adjust the flow of CaO solids entering the carbonator entrainment zone.

FIG. 7 represents a particular case of application of the method of this invention for the cement industry or other industries requiring a large inlet flow of $CaCO_3$ rich solids (10). Since the cooling capacity of such flow (10) is large, there is no need of other cooling steps of the solid entrainment zone (9), as explained in example 3 below. However, the resulting large flow of solids from the carbonator to the calciner (6) must be purged of 50-90% of the solids before coming back to the carbonator as CaO in solid stream (4). The purge can be non-selective, for example as a solid split in the solids coming down from cyclone (102) (split not shown for simplicity). But preferably, the purge is selective in particle size, as a solid flow of calcined material (61) in the fly ash of the calciner. Removing fine material from the calciner is known to facilitate a particle size distribution in the calcined material returning to the carbonator (4) more suitable to sustain the characteristic axial solid concentration profiles of circulating fluidized bed carbonators, as in FIG. 2.

Figure 6:
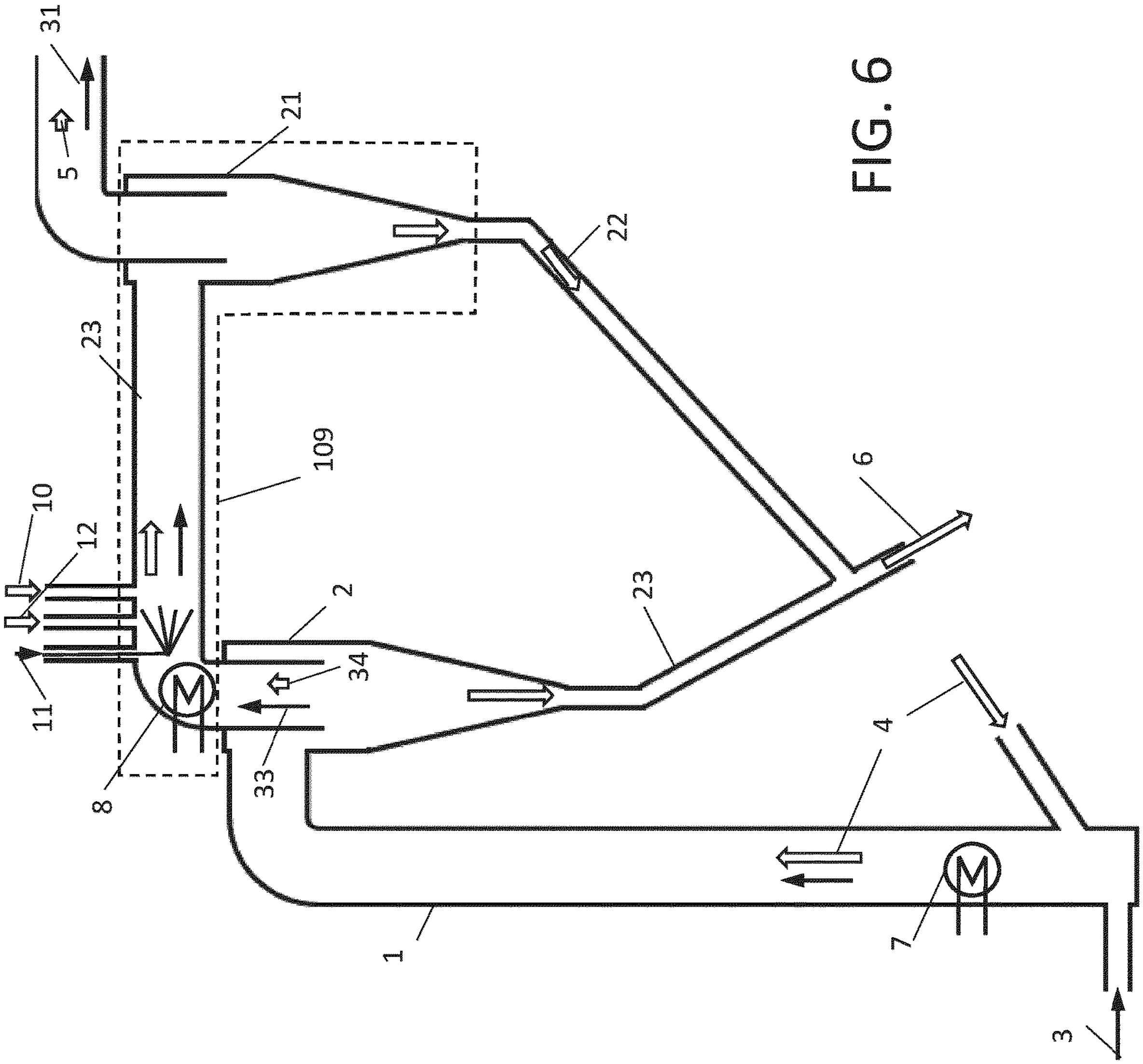
FIG. 6. Schematic representation of a solid entrainment zone created by mixing the $CO_2$ depleted gas with the make up flow of limestone, and the injection of $Ca(OH)_2$ until the $CO_2$ depleted gas and the solids separate in a second cyclone.

The devices to carry out the methods of this invention are schematically represented in FIGS. 1, 6 and 7. They combine elements such as circulating fluidized bed carbonator chambers described as having a 10-40 m height (as in circulating fluidised bed combustion boilers) or the piping for entrained bed carbonators (having lengths exceeding 100 m as in cement calciner applications). Also, the gas connections between these devices and the cyclones or other gas-solid separation devices (that can be designed to provide different solid capture efficiencies for fines or coarser solids), or the solid stand pipes, solid feeding systems for fine powders and solid dispersion devices for said solids are known in the state of the art of the power and cement industries, among others. Considering the experimental results and generalised simulations of the calcium looping noted in the examples, the particular circulating fluidised bed devices used in the to carry out the method of this invention are characterized by additional cooling heat transfer surfaces (8), make up flow of limestone (10), water spraying (11) and injection of $Ca(OH)_2$ (12), being located in an entrainment zone of 10-30 m length starting at 5-10 m over the bottom gas inlet to the carbonator as shown in FIG. 1. In those applications of the method where an additional entrained zone is created by (see FIG. 6) at least by the injection of $Ca(OH)_2$ for $CO_2$ polishing, the length of the said entrained zone has to provide a residence time of 1 to 3 seconds to the $CO_2$ depleted gas leaving the first cyclone of the carbonator to ensure maximum utilisation of the $Ca(OH)_2$. The entrainment zone has been represented in FIG. 6 mainly as a horizontal gas conduct (23), but this only for convenience as vertical entrainment zones with upward and downwards gas-solid flow are known in the state of the art. The remaining elements of said device are represented in FIG. 6 within the dashed boundary line marking the approximated location of the solid entrainment zones where cooling and $Ca(OH)_2$ injection is applied to enhance the $CO_2$ capture efficiencies.

EXAMPLES

Mass and energy balances are solved in these examples to illustrate the application of the method disclosed in this invention to a particular case of application of the method to a solid entrainment zone (9) within a circulating fluidized bed carbonator (1) (following FIG. 1), an additional entrainment zone as in FIG. 6 and a third case applied to a cement plant with a high flow make up flow of limestone (10). For simplicity and transparency, the following thermodynamic parameters are assumed to be constant: enthalpy of carbonation and calcination=170 kJ/mol Ca; enthalpy of $Ca(OH)_2$ dehydration=104 kJ/mol, heat capacity of all solids=0.8 kJ/kgK, vaporization heat of water=2260 kJ/kg, heat capacity of liquid $H_2O$=4.2 kJ/kgK and heat capacity of the rest of gases=1 kJ/kgK. The skilled in the art will be able to refine the calculations provided below and adapt them to other conditions or combinations of the preferred embodiments solved below.

Example 1

This example corresponds to the method with a single solid entrainment zone (9) created within the circulating fluidized bed carbonator (1). FIG. 1 is used to guide the notation of mass and energy flows. For simplicity, mass and energy flows are all referred per square meter of cross-section area of the carbonator. A flue gas flow (3) of a total 66 $mol/m^2$ s with a $CO_2$ concentration of 15.2% v is fed into the carbonator. This results into an inlet $CO_2$ molar flow of 10 $mol/m^2$ s which meets a rich CaO stream (4) molar flow of 90 $mol/m^2$ s composed by 100% CaO (for simplicity, fuel ash and other inert compounds that can be present in these solids are considered here as to be equivalent to the inactive part of the CaO). A maximum average $CO_2$ carrying capacity ($X_{ave}$) of 0.15 is assumed, achievable by a typical ratio between make up flow of limestone ($F_0$) and molar flow of $CO_2$ ($F_{CO2}$) entering the carbonator of 0.1. The $CO_2$ capture efficiency in the dense bed of the carbonator is assumed to be 90%, in line to what has been demonstrated in the state of the art when using circulating fluidized bed carbonators. As result, the carbonation conversion of the solids in the dense bed is 0.10 and the molar $CO_2$ molar flow entering the entrainment zone (9) is 1.0 $mol/m^2$ s with concentration of 1.8%$_v$. Gas and solids leaving the bottom part of the carbonator enter the entrainment zone (9). Due to the cooling method described below, the entrainment zone (9) is assumed to operate at a temperature of 550° C., which allows a minimum $CO_2$ concentration of 0.096% v and a maximum $CO_2$ capture efficiency of 99.5% if equilibrium conditions were reached at the end of such entrainment zone. However, the kinetics of the carbonation reaction is limiting the carbonation conversion and the associated $CO_2$ capture efficiency. To estimate the actual value of capture efficiency a plug-flow model for the gas and the solids in the entrainment zone is assumed. The gas-solid contact time in the entrainment zone is 5 s which is achievable with a standard height of the entrainment zone of about 19 m in this example. The carbonation conversion of the solids in the entrainment zone has been calculated assuming a basic particle reactor model ($dX/dt=k_s X_{ave}\overline{(v_{CO2}-v_{CO2eq})}$) which has been proven to be valid to estimate the carbonation conversion under relevant carbonation conditions at large scale (B. Arias et al. 'Demonstration of steady state $CO_2$ capture in a 1.7 $MW_{th}$ calcium looping pilot". Int. J. of Greenhouse Gas Control, 18, 237-245, 2013). In this equation, $k_s$ is the effective constant rate (assumed to be 0.36 $s^{-1}$), $X_{ave}$ is the maximum average $CO_2$ carrying capacity, $v_{CO2}$ is the $CO_2$ molar fraction and $v_{CO2}$ is the minimum $CO_2$ molar fraction given by the equilibrium. For a reaction time of 5 s and the conditions of this specific example, a carbonate conversion of the solids in the entrainment zone of 0.0037 is calculated which allows capturing an additional $CO_2$ flow of 0.33 $mol/m^2$ s in the carbonator and increasing the $CO_2$ capture efficiency to 93.3. This is a 33% reduction of the $CO_2$ leakage (10 percentual point in the reference method when $CO_2$ capture efficiency is 90% vs the 6.7 percentual points achieved in this example).

Note that in order to achieve the maximum $CO_2$ capture efficiency allowed at a temperature of 550° C., $Ca(OH)_2$ (12) can also be fed at the inlet of the entrainment zone. According to the data experimental data presented in FIGS. 4 and 5, a maximum $Ca(OH)_2$ conversion to $CaCO_3$ of 0.6 can be expected in the entrainment zone (9) for a reaction time of 5 s. In this case, a $Ca(OH)_2$ molar flow of 1.03 mol/m$^2$ s is fed and the inlet of the entrainment zone (9) which also reduces by 0.04 MWth/m$^2$ the cooling requirements. This is a 95% reduction of the $CO_2$ leakage, at the expense of the additional requirement of the stated flow of $Ca(OH)_2$ (12) to achieve such deep decarbonization of the flue gas (31).

The cooling requirements to operate the entrainment zone of this example at 550° C. can be estimated by solving an energy balance, considering the heat released by the carbonation reaction and the sensible heat from the gas and solids streams leaving and entering this zone. Thus, operating the entrainment zone at 550° C. requires to extract 0.681 MWth/m$^2$ of which a large fraction corresponds to the sensible heat of the solids (0.434 MWth/m$^2$) and the gas (0.191 MWth/m$^2$). For this specific case, the make up flow of limestone (10) is relatively small and only reduces the cooling demand in the entrainment zone down to 0.639 MWth/m$^2$ (the benefits of using large make up flow of limestone are illustrated in Example 3). Therefore, the thermal power to be extracted from the entrainment zone (9) can be achieved with the heat exchanger section (8), and used in the steam cycle of the calcium looping. If this option is not available (for example because the retrofit of the heat exchanger (8) is too costly) the thermal power to be extracted from the entrainment zone could be dissipated by spraying and evaporating a water flow (11) of 0.21 kg/m$^2$ s (in the extreme case where this section (9) is operated adiabatically with no other heat recovery).

The cooling of solids containing $CaCO_3$ (6) in the entrainment zone will increase the heat requirements in the calciner. Compared with a reference case with no cooling of the entrainment zone and the solids containing $CaCO_3$ (6) leaving the carbonator at 650° C., the energy needed to heat up the solids a calciner operating at 910° C. will increase by almost 38%. In these conditions, and in order to reduce this additional energy demand in the calciner, it would be desirable to apply the method of this invention to an additional entrained bed region created after the separation of a main solid flow (6) from the solid flow in the first entrainment zone (4) (see Example 2).

Example 2

Example 2 corresponds to a case with an additional entrainment zone created after cyclone (2), to avoid the cooling of the large flow of solids (4) circulating through the carbonator (1). This example follows notation of FIG. 6. As in Example 1, a flue gas flow (3) containing 10 mol/m$^2$ s of $CO_2$ is fed into the carbonator which operates in this case at 680° C. This temperature, slightly higher than the standard 650° C., would reduce the energy required to calcine the solids containing $CaCO_3$ (6) by almost 12% respect to a reference case in Example 1, but this would be at the expense of a lower $CO_2$ capture efficiency of 85% in this case (90% in the reference) in the absence of the additional features provided by the method of this invention. As noted in FIG. 6, a $CO_2$ depleted gas molar flow of 57.5 mol/m$^2$ s (33) leaves the cyclone (2) together with a certain flow of solids (34) that for simplicity in the calculations below is assumed to be zero in this Example. An additional entrainment zone (109) is created by injecting and dispersing solids (10, 12) to the gas exiting the cyclone. The additional entrainment zone can be extended until the point where the gas (31) and solids (5) separate in a second cyclone (21), to allow gas-solid contact times of between 1-2 seconds (required for close-to-maximum carbonation of $Ca(OH)_2$ powders). The cooling of this region will allow operation of the additional entrainment zone (109) at a temperature of 550° C., as will be calculated below. In this case, the cooling requirements are largely reduced, down to a value of 0.249 MWt/m$^2$, as the solids circulating through the carbonator (4) are separated in the cyclone (2) and do no longer participate in the additional entrainment zone (109) cooled to enhanced $CO_2$ capture. In these conditions, the $CO_2$ molar flow entering the entrainment zone in stream (33) is 1.45 mol/m$^2$ s, and the equilibrium of $CO_2$ on CaO allows a reduction down to 0.06 mol/m$^2$ s in the $CO_2$ depleted gas (31). To approach such a deep decarbonisation (99.4% capture efficiency), this additional entrainment zone (109) can be dimensioned to achieve a $Ca(OH)_2$ conversion to $CaCO_3$ of 0.4, which results into a $Ca(OH)_2$ molar flow (12) requirement of 3.6 mol/m$^2$ s. If this flow of $Ca(OH)_2$ solids (12) arrives at ambient temperature, this reduce the cooling requirement in this zone by 0.244 MWth/m$^2$. Therefore, combined with the cooling effect of the make up flow of limestone (10), the conditions selected for this specific example are such as to avoid the need of a heat exchanger section (8) at the beginning of the additional entrainment zone (109) and also avoid the need to spray water (11) in such section. Other operation conditions (for example when accepting inefficiencies in the cyclone (2) leaving a flow of solids (34) different to zero) will require the combination of cooling steps as in Example 1. They can be combined in order to achieve the target temperature in the additional entrainment zone (109).

Example 3

This example follows the notation of FIG. 7. It is similar to Example 1, but adapted to a particular application of the method of this invention to a calcium looping system operating in a cement plant. In these systems, it is known that the makeup flow of limestone and other solids contained in the raw meal (10) is between one and two orders of magnitude higher than the limestone make up flow (10) characteristic of postcombustion calcium looping systems (FIG. 1). This is a key difference in the applicability of the method of this invention because the feeding of the large make up flow (10) to the beginning of the entrainment zone (9) can be sufficient to achieve the target temperature in said entrainment zone. The mass and heat balances for a particular case example are adapted below. As in Example 1, a flue gas flow (3) of 66 mol/m$^2$ s with a $CO_2$ concentration of 15.2% v is fed into the carbonator, which operates at 650° C. in the dense zone with an inlet gas velocity of 5 m/s, resulting into an inlet $CO_2$ molar flow of 10 mol/m$^2$ s. Due to the large $CaCO_3$ make up flow input (10-) to fulfill the solid requirements in the cement plant, a $F_O/F_{CO2}$ of 4, with a maximum average $CO_2$ carrying capacity ($X_{ave}$) of the solids of 0.50 can be assumed. Thanks to the higher $X_{ave}$, the CaO stream (4) coming from the calciner can be largely reduced, and a molar flow of 30 mol/m$^2$ s of CaO (4) can be assumed to enter the carbonator to achieve a $CO_2$ capture efficiency in the dense bed of the carbonator of 90%. As result, the carbonation conversion of the solids in the dense bed is 0.30 and the molar $CO_2$ molar flow entering the entrainment zone (9) is 1.0 mol/m$^2$ s with concentration of 1.8% v. The reduction in the solid flow arriving to the carbonator (4) from the solid leaving the carbonator (6) dictates for the need of a large extraction of solids (61, 111) in the calciner. This solid extraction from the calciner can be arranged in many forms known in the state of the art and will typically be directed at high temperature to the rotary kiln producing clinker. For simplicity, the extraction of the calcine material (61) in this example is represented in FIG. 7 as an inefficiency in the calciner cyclone (102) and a certain flow of purged solids as bottom ash (111). Other cyclones or devices to separate fine solids (61) from the $CO_2$ rich gas (105) are omitted, as they are known in the state of the art.

Note that in this example, the entrainment zone (9) operates at a temperature of 550° C. as in Example 1, thanks to the cooling capacity of this region by the introduction of the solid make up flow of 40 mol $CaCO_3/m^2$ s (10-). The gas-solid contact time in the entrainment zone is 5 s. The carbonation conversion of the solids in the entrainment zone has been calculated as in Example 1, which results into a carbonate conversion of the solids 0.010. This allows capturing an additional $CO_2$ flow of 0.30 mol/$m^2$ s and increasing the $CO_2$ capture efficiency up to 93.2 in the carbonator (1). In this example, it is assumed that the fraction of other solids apart from $CaCO_3$ represents a 20% of the total flow of the make up flow (10-) fed into the carbonator which is typical for raw meals. In addition, in order to maximize the energy efficiency in cement plants, raw meals are preheated using the flue gases leaving the rotary kiln. In this Example, the entrainment zone (9) can be operated at 550° C. operated adiabatically (without the need of heat exchanger (8)) or the spray of water (11) by preheating up to 450° C. the make up flow of limestone (10) before being fed into the carbonator.

Higher $CO_2$ capture efficiencies can be achieved in this specific case by feeding $Ca(OH)_2$ (12) as discussed in Example 1. Thus, the maximum $CO_2$ capture of 99.5% allowed at 550° C. can be achieved by feeding a $Ca(OH)_2$ molar flow (12) of 1.03 mol/$m^2$ s at inlet of the entrainment zone (9).

The invention claimed is:

1. A method to increase the $CO_2$ capture efficiency by carbonation in the fluidized bed carbonator reactor of a calcium looping process, where a flow of gas containing $CO_2$ enters a bottom part of the carbonator and contacts with a flow of calcined material rich in CaO to react and form $CaCO_3$, capturing the residual $CO_2$ from the flow of gas already depleted in $CO_2$ that leaves a dense region of solids present at the bottom of the carbonator, in at least one solid entrainment zone, where the flow of gas and solids approaches an ideal plug-flow behaviour, with negligible retro-mixing of solids with the dense region at the bottom of the carbonator, wherein the method further comprises a step of cooling to 500-600° C. the at least one solid entrainment zone in which the solids are in contact with the gas in suspension during 1-10 seconds until separating into a solid stream containing $CaCO_3$ and a $CO_2$ depleted gas, the method further comprising the following step:

feeding a flow of $Ca(OH)_2$ powder at ambient temperature to the at least one solid entrainment zone at a molar rate of between 0.01-0.4 times of the molar rate of $CO_2$ entering the carbonator.

2. The method of claim 1, wherein the cooling to 500-600° C. of the at least one solid entrainment zone is carried out just before a separation of the $CO_2$ depleted gas and the carbonated solids from the carbonator.

3. The method of claim 2 wherein an additional entrainment zone is generated by the feeding of part of a limestone make up flow and part of a $Ca(OH)_2$ powder to the $CO_2$ depleted gas after the separation of the $CO_2$ depleted gas and the carbonated solids from the carbonator.

4. The method of claim 3 wherein the molar feed rate of $Ca(OH)_2$ powder to the additional entrainment zone is between 1 to 3 times the molar flow rate of $CO_2$ in the $CO_2$ depleted gas exiting the at least one first entrainment zone.

5. The method of claim 3 further comprising the separation from the $CO_2$ depleted gas of the carbonated solids exiting the additional entrainment zone and their feeding to the solid stream containing $CaCO_3$.

6. The method of claim 1, further comprising the integration of the carbonator in a cement plant or in an industry calcining limestone, wherein the calcination of limestone is carried out at a molar rate of 1-5 times the molar flow rate of $CO_2$ in the flue gas, and removing after calcination of between 50-90% of the solids exiting the carbonator.

7. A circulating fluidized bed carbonator device to carry out the method of claim 1 having a bottom part with a length of 5-10 m over the bottom gas pipe inlet of the carbonator, a solid return inlet to feed the calcined material rich in CaO from a calciner, and a solid entrainment zone located after the bottom part of the carbonator wherein the residual $CO_2$ from the gas pipe inlet is captured, wherein the at least one entrainment zone comprises a length of 10-30 m, the at least one entrainment zone further comprising:

i) a first solid feeding pipe at the beginning of the at least one entrainment zone to feed the make up flow of limestone entering the calcium loop and disperse the solids into the carbonator cross-section;

ii) a second solid feeding pipe at the beginning of the at least one entrainment zone to feed $Ca(OH)_2$ in powdered form and disperse into the gas; and iii) a water feeding pipe comprising nozzles to spray water into the gas at the beginning of the at least one entrainment zone until the target temperature between 500-600° C. is reached.

8. A device of to carry out the method of claim 3 comprising:

i) a gas conduit to provide a residence time of 1 to 3 seconds to the $CO_2$ depleted gas leaving the first cyclone of the carbonator in a calcium looping system;

ii) a solid feeding pipe to feed part of the make up flow of limestone entering the calcium looping system to the beginning of the gas conduit and to disperse the solids into the gas;

iii) a water feeding pipe comprising nozzles to spray water to the beginning of the gas conduit;

iv) a solid feeding pipe connected to the beginning of the gas conduit to feed $Ca(OH)_2$ in powdered form and disperse the $Ca(OH)_2$ into the gas;

v) a second cyclone to separate the $CO_2$ depleted gas from solids fed to the gas conduit; and vi) a standpipe to feed the separated solids in the second cyclone to the solid stream containing $CaCO_3$ leaving the carbonator.

9. The method of claim 1, wherein the cooling to 500-600° C. the at least one solid entrainment zone is further achieved by at least one of the following steps:

i) feeding a make-up flow of limestone at ambient temperature to the beginning of the at least one solid entrainment zone;

ii) installing at the beginning of the at least one solid entrainment zone a heat exchanger section of a water/steam circuit that recovers energy from the calcium looping system; or iii) spraying water to the beginning of the at least one solid entrainment zone.

10. The method of claim 9, wherein the cooling to 500-600° C. of the at least one solid entrainment zone is carried out just before a separation of the $CO_2$ depleted gas and the carbonated solids from the carbonator.

11. The method of claim 10 wherein an additional entrainment zone is generated by the feeding of part of a limestone make up flow and part of a $Ca(OH)_2$ powder to the $CO_2$ depleted gas after the separation of the $CO_2$ depleted gas and the carbonated solids from the carbonator.

12. The method of claim 11 wherein the molar feed rate of $Ca(OH)_2$ powder to the additional entrainment zone is between 1 to 3 times the molar flow rate of $CO_2$ in the $CO_2$ depleted gas exiting the at least one first entrainment zone.

13. The method of claim 12 further comprising the separation from the $CO_2$ depleted gas of the carbonated solids exiting the additional entrainment zone and their feeding to the solid stream containing $CaCO_3$.

* * * * *